(12) United States Patent
Giraud et al.

(10) Patent No.: US 10,994,739 B2
(45) Date of Patent: May 4, 2021

(54) DETERMINATION OF A MOTORCYCLE RIDER'S STATE

(71) Applicant: Damon Motors Inc., Vancouver (CA)

(72) Inventors: Damon Jay Giraud, North Vancouver (CA); Dominique Kwong, Coquitlam (CA)

(73) Assignee: Damon Motors Ltd., Vancouver (CA)

(*) Notice: Subject to any disclaimer, the term of this patent is extended or adjusted under 35 U.S.C. 154(b) by 0 days.

(21) Appl. No.: 16/644,451

(22) PCT Filed: Sep. 6, 2018

(86) PCT No.: PCT/CA2018/051082
§ 371 (c)(1),
(2) Date: Nov. 18, 2020

(87) PCT Pub. No.: WO2019/046947
PCT Pub. Date: Mar. 14, 2019

(65) Prior Publication Data
US 2020/0377106 A1     Dec. 3, 2020

Related U.S. Application Data

(60) Provisional application No. 62/580,629, filed on Nov. 2, 2017, provisional application No. 62/570,028, filed (Continued)

(51) Int. Cl.
*B60W 40/08*     (2012.01)
*B62J 45/422*    (2020.01)
(Continued)

(52) U.S. Cl.
CPC ............ *B60W 40/08* (2013.01); *B60W 30/08* (2013.01); *B60W 40/10* (2013.01); *B60W 40/13* (2013.01);
(Continued)

(58) Field of Classification Search
CPC ...... B60W 40/10; B60W 40/13; B60W 50/16; B60W 2540/227; B60W 2040/0872;
(Continued)

(56) References Cited

U.S. PATENT DOCUMENTS 9,227,682 B2 *   1/2016  Oettgen ................ B60W 40/08
10,029,683 B1 *  7/2018  Ginther ................ B60W 40/08
(Continued)

FOREIGN PATENT DOCUMENTS

DE            10242447            3/2004

*Primary Examiner* — Peter D Nolan
*Assistant Examiner* — Wae L Louie
(74) *Attorney, Agent, or Firm* — Damien G. Loveland

(57) ABSTRACT

Force-detecting sensors are installed in a motorcycle's handlebars, footpegs and seat to detect the rider's grip, weight and weight distribution. A control unit interprets the signals from the sensors to determine an attribute of the rider or an intention of the rider to make a manoeuvre. Signals from environmental sensors are used by the control unit to determine whether the intended manoeuvre would endanger the rider, and, if so, the rider is alerted before the manoeuvre is undertaken. The alert is provided before the rider notices the hazard, or before the rider reacts to the hazard. By giving advance warning, of as little as a fraction of a second, a rider is given extra time to avert a potential accident. The control unit also controls settings of the motorcycle during a hazardous state of the motorcycle.

17 Claims, 4 Drawing Sheets

Related U.S. Application Data on Oct. 9, 2017, provisional application No. 62/554,697, filed on Sep. 6, 2017.

(51) Int. Cl.

| | |
|---|---|
| *B60W 30/08* | (2012.01) |
| *B60W 40/10* | (2012.01) |
| *B60W 40/13* | (2012.01) |
| *B60W 50/16* | (2020.01) |
| *G01D 21/02* | (2006.01) |
| *G01G 19/44* | (2006.01) |
| *G01M 1/12* | (2006.01) |

(52) U.S. Cl.
CPC ............ *B60W 50/16* (2013.01); *B62J 45/422* (2020.02); *G01D 21/02* (2013.01); *G01G 19/44* (2013.01); *G01M 1/122* (2013.01); *B60W 2040/0872* (2013.01); *B60W 2040/1315* (2013.01); *B60W 2510/18* (2013.01); *B60W 2510/20* (2013.01); *B60W 2540/221* (2020.02); *B60W 2540/227* (2020.02); *B60W 2540/30* (2013.01); *B60W 2554/00* (2020.02)

(58) Field of Classification Search
CPC .......... B60W 2040/1315; G01D 21/02; G01G 19/44; G01M 1/122
See application file for complete search history.

(56) References Cited

U.S. PATENT DOCUMENTS

| | | | |
|---|---|---|---|
| 2014/0015662 A1* | 1/2014 | Oettgen | B60W 40/08 340/439 |
| 2016/0144915 A1* | 5/2016 | Bejestan | G01C 21/3484 340/432 |
| 2017/0066492 A1* | 3/2017 | Arkhangelskiy | B60Q 1/2607 |
| 2020/0377106 A1* | 12/2020 | Giraud | B60W 40/08 |

* cited by examiner

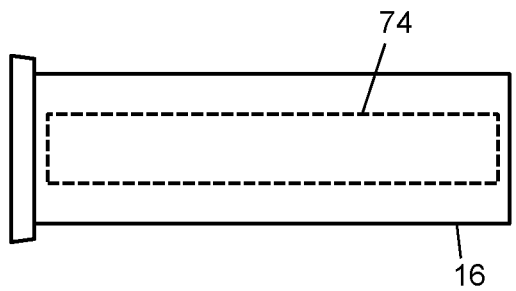 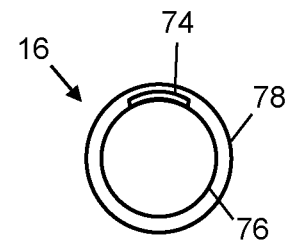
FIG. 3  FIG. 4
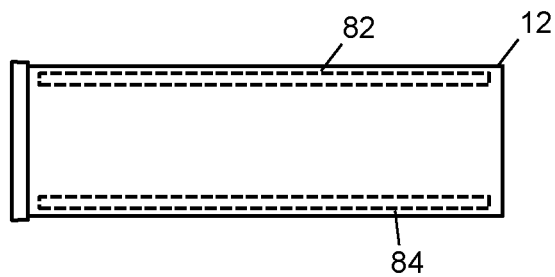 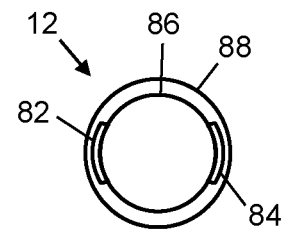
FIG. 5  FIG. 6
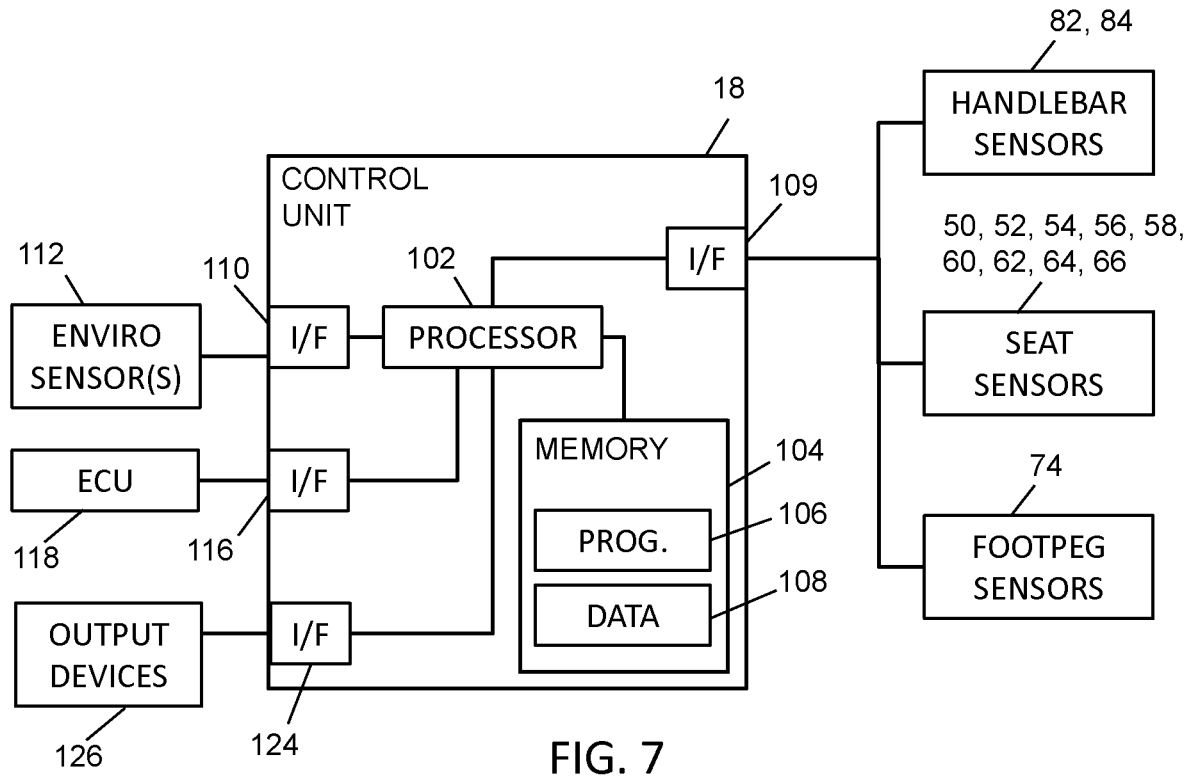
FIG. 7

DETERMINATION OF A MOTORCYCLE RIDER'S STATE

TECHNICAL FIELD

This application relates to a motorcycle equipped with sensors for determination of a motorcycle rider's state, including rider attributes and intent to manouever. More specifically, it relates to a motorcycle equipped with force-detecting sensors in the handlebars, footpegs and/or seat, and a control unit to interpret signals from the sensors.

BACKGROUND

Motorcycles are fundamentally unsafe, with riders being many times more likely to die in an accident than car drivers. Every year, 160 million motorcycles are sold, which is double the number of cars. South East Asia accounts for 86% of the motorcycles that are sold, where they outnumber cars by a factor of ten.

In South East Asia, motorcycle ridesharing is fast becoming the primary mode of travel. Rideshare operators are projected to surpass 1 million rides per day. It is especially important for these companies to use the safest possible motorcycles.

SUMMARY OF INVENTION

The present invention is directed to a motorcycle equipped sensors in the handlebars, foot pegs and/or seat, which detect the rider's position on the motorcycle and the forces that the rider is exerting on the motorcycle. A control unit is connected to the sensors and is configured to interpret the signals from the sensors. Further sensors for detecting the environment of the motorcycle are mounted on the motorcycle and connected to the control unit. Based on the rider's intent and the detected environment, the control unit determines whether the situation is hazardous, and, if so, alerts the rider. The rider is alerted by haptic devices, visual indicators, and/or audible alerts, and the motorcycle can also be controlled to a certain extent, for example to ease off the throttle or control the suspension while braking hard.

Disclosed herein is a system for determining a motorcycle rider's state comprising: a plurality of force sensors located on the motorcycle so as to detect forces exerted on the motorcycle by a rider of the motorcycle; and a control unit communicatively connected to the sensors and configured to receive signals from the sensors, compare the signals to one or more thresholds, and determine a state of the rider based on said comparison.

Also disclosed is a method for determining a motorcycle rider's state comprising: locating a plurality of force sensors on a motorcycle so as to detect forces exerted on the motorcycle by a rider of the motorcycle; receiving, by a control unit, signals from the sensors; comparing, by the control unit, the signals to one or more thresholds; and determining, by the control unit, a state of the rider based on the comparing step.

BRIEF DESCRIPTION OF DRAWINGS

The following drawings illustrate embodiments of the invention, which should not be construed as restricting the scope of the invention in any way.

FIG. 3 is a schematic top view of a footpeg equipped with a force sensor, in accordance with an embodiment of the present invention.

FIG. 4 is a cross-sectional view of the footpeg of FIG. 3.

FIG. 5 is a schematic top view of a handlebar equipped with two force sensors, in accordance with an embodiment of the present invention.

FIG. 6 is a cross-sectional view of the handlebar of FIG. 5.

FIG. 7 is a schematic block diagram of a control unit and connected sensors, according to an embodiment of the present invention.

DESCRIPTION

A. Glossary

The term "engine control unit (ECU)" refers to the computer that controls and monitors various components and states of an engine or vehicle in which the engine is mounted.

The term "haptic" refers to both the sense of touch (tactile feedback) and the ability to detect shape and forces (kinesthetic feedback). Tactile feedback is used to detect surface texture, temperature and vibrations, for example. Kinesthetic feedback is used to detect changes in shape, motion, forces and weights.

The term "module" can refer to any component in this invention and to any or all of the features of the invention without limitation. A module may be a software, firmware or hardware module.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may be located together or separate from each other.

The term "rider" refers to the person who drives or controls a motorcycle, and is to be distinguished from a person who rides pillion on the motorcycle or otherwise as a passenger.

The term "attitude" refers to the pitch of a motorcycle, e.g. the extent to which it dives while braking.

B. Industrial Applicability

If motorcycle riders on the road could be given just one extra second to avoid a hazard, tens of thousands of accidents could be prevented each year. By determining the rider's intent before the rider starts to manoeuvre, the present invention can provide the rider with an advance warning if the manoeuvre is going to be hazardous. While the advance time of the warning is brief, it still provides the rider with valuable thinking and reaction time in which to abandon or modify the manoeuvre.

C. Exemplary Embodiments

Figure 1:
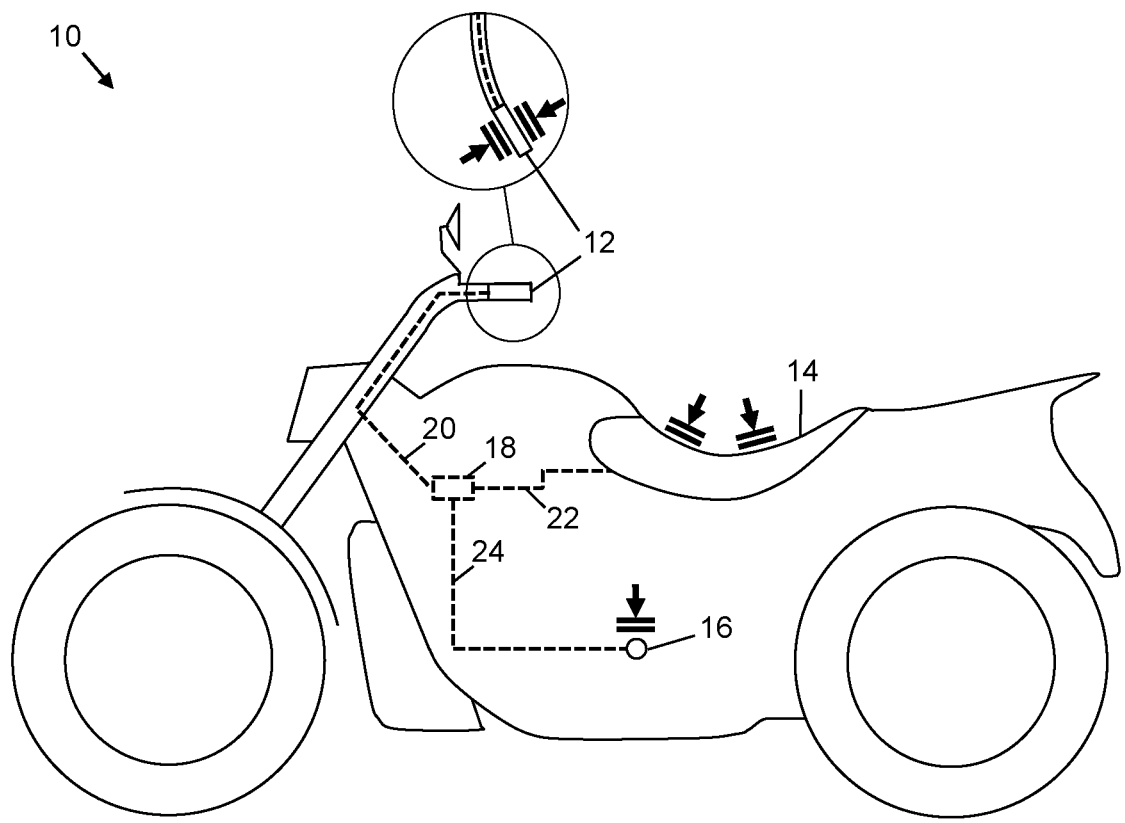
FIG. 1 is a schematic side view of a motorcycle showing sensors in the handlebars, seat and footpegs, in accordance with an embodiment of the present invention.

Referring to FIG. 1, there is shown a motorcycle 10 equipped with force-sensing handlebars 12, a force-sensing seat 14 and force-sensing footpegs 16. Each of the handlebars 12 has sensors that can detect the forwards and rearwards forces on the handlebar. The seat 14 has an array of force-detecting sensors in multiple locations. The footpegs 16 each have sensors that detect the downwards force on the footpeg.

The force-sensing components 12, 14, 16 are connected to a control unit 18 via connecting cables 20, 22, 24. The control unit 18 receives signals from the force-sensing components 12, 14, 16 and is configured to deduce rider attributes and intent from the signals. The control unit 18 is located piggyback on the engine control unit (ECU). The force-sensing components 12, 14, 16, the control unit 18 and the connectors 20, 22, 24 may be installed in the motorcycle during its production, or they may be provided as a retrofit kit for installation after production.

Figure 2:
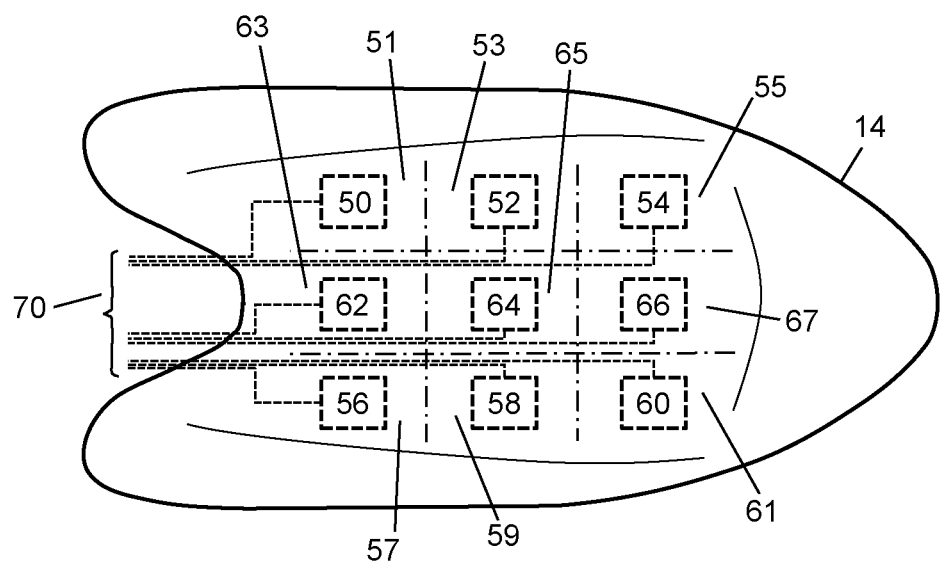
FIG. 2 is a top view of a motorcycle seat with embedded sensors, in accordance with an embodiment of the present invention.

Referring to FIG. 2, a force-sensing motorcycle seat 14 is shown with an array of embedded force sensors 50, 52, 54 on the right side; 56, 58, 60 on the left side; and 62, 64, 66 along the centre. Front right force sensor 50 detects the force caused by the weight of the rider on front right section 51 of the seat, which is delineated in part by the dot-dash lines. Middle right force sensor 52 detects the force caused by the weight of the rider on middle right section 53 of the seat. Rear right force sensor 54 detects the force caused by the weight of the rider on rear right section 55 of the seat. Front left force sensor 56 detects the force caused by the weight of the rider on front left section 57 of the seat. Middle left force sensor 58 detects the force caused by the weight of the rider on middle left section 59 of the seat. Rear left force sensor 60 detects the force caused by the weight of the rider on rear left section 61 of the seat. Front centre force sensor 62 detects the force caused by the weight of the rider on front centre section 63 of the seat. Centre force sensor 64 detects the force caused by the weight of the rider on central section 65 of the seat. Rear centre force sensor 66 detects the force caused by the weight of the rider on rear centre section 67 of the seat. Wires 70 connect at one end to the sensors 50, 52, 54, 56, 58, 60, 62, 64, 66 and at the other end form the cable 22 that connects to the control unit 18.

The sensors in the seat act independently of each other, so that they can sense whether the rider is sitting in a neutral position, to the left, to the right, forwards, rearwards, forward to the left, forward to the right, rearward to the left, and rearward to the right. The sensors in the seat can also distinguish the extent to which the rider is sitting in an off-neutral position. For example, the rider may be only slightly off-neutral or significantly off-neutral.

The sensors in the seat 14 are linear force meters, or large-surface area force sensors that are embedded a short distance below the surface of the seat.

In other embodiments, the number of force sensors in the seat is different to the nine shown here. For example, in other embodiments, the number of sensors is four. Also, the positions of the sensors in other embodiments may be different, and they may not necessarily be positioned in a square or rectangular array as shown here.

Referring to FIGS. 3 and 4, an exemplary force-sensing footpeg 16 is shown. A force sensor 74 is embedded centrally in the top of the footpeg 16. The force sensor 74 is a large surface area sensor that is embedded just below the upper surface of the footpeg. The sensor 74 extends for substantially the whole of the length of the footpeg in order to capture forces from the entire width of the foot. FIG. 4 shows that the sensor 74 is mounted on the rigid inner tube 76 of the footpeg 16, and is covered with the rubber footpeg cover 78. In other embodiments, the rotational orientation of the sensor 74 may be other than directly above the axis of the footpeg, and may, for example, be positioned either rearwards or forwards of top dead centre of the footpeg.

Referring to FIGS. 5 and 6, an exemplary force-sensing handlebar 12 is shown, as may be found on the left side of a motorcycle 10. One force sensor 82 is embedded in the forward facing side of the handlebar 12. Another force sensor 84 is embedded in the rearward facing side of the handlebar 12. The force sensors 82, 84 are large surface area sensors that are mounted on the rigid inner tube 86 of the handlebar 12, and embedded just below the outer surfaces of the handlebar. The sensors 82, 84 extend for substantially the whole of the length of the handle in order to capture forces from the entire width of the hand. FIG. 6 shows that the sensors 82, 84 are covered with the rubber grip 88 covering the handlebar 12.

In other embodiments, the sensors 82, 84 may wrap further or less around the circumference of the handlebar than shown. A single sensor or more than two sensors can be used in other embodiments. A single sensor may be used that detects the distribution of the forces that are applied to it. Sensors may wrap entirely around the handlebars. In still other embodiments, the rotational orientation of the sensors 82, 84 may be other than directly forward and rearward of the axis of the handlebar 12. For example, the sensors 82, 84 may be centered slightly above or below the plane of the axis of the handlebar 12.

FIG. 7 shows the modules of a system for determination of a motorcycle rider's state, i.e. a rider's attributes and intent. The control unit 18 has one or more processors 102 that are operably connected to one or more computer readable memories 104. The memory 104 stores computer readable instructions in the form of one or more programs 106, and computer readable data 108.

The control unit 18 includes multiple interfaces, including interface 109 for connecting to force-detecting sensors such as handlebar sensors 82, 84, seat sensors 50, 52, 54, 56, 58, 60, 62, 64, 66 and footpeg sensors 74.

The program 106 is executed by the processor 102 to detect and interpret signals from the various sensors that are connected to the control unit 18. By determining the forces on the seat 14 and footpegs 16, the control unit 18 can calculate an approximate weight of the rider. By determining the distribution of forces on the seat, the control unit 18 can calculate whether, and how far, the rider is leaning. By determining the forces on the handlebars 12, the control unit 18 can determine an approximate experience level of the rider. New and nervous riders tend to grip the handlebars more forcefully than experienced and more comfortable riders, which is more evident particularly when safety is a concern, e.g. when there is an increased risk of the motorcycle falling or another potential accident. By knowing the experience level of the rider, the control unit 18 can adapt the warnings given to the rider accordingly.

The control unit 18 also includes interface 110 for connecting to environmental sensors 112. The environmental sensors 112 detect the presence and position of other vehicles on the road, their speed, and the direction they are moving in, or about to move in. The environmental sensors 112 can also detect parameters of the environment in which the rider is riding, such as temperature, presence of precipitation, road surface condition, etc. Environmental sensors 112 include one or more of a camera, a stereoscopic camera, an infrared camera, a lidar, a radar, a rangefinder, a microphone, a thermometer, a road temperature detector, a surface condition sensor, etc. The processor uses the sensed environmental data to determine whether the rider's intended manoeuvres will create a potential safety issue.

The control unit 18 also includes interface 116 for connecting to ECU 118, e.g. via a vehicle bus. The processor 102 interprets signals obtained from the ECU 118, to determine speed of the motorcycle, suspension settings, traction control settings, acceleration etc. The processor 102 uses the sensed ECU data to determine whether the rider's intended manoeuvres will create a potential safety issue. The processor 102 is also able to instruct the ECU 118 to control one or more parameters of the motorcycle 10, such as the throttle, the suspension settings, the traction control settings, the ABS (anti-lock braking system), etc. The processor 102 controls the ECU 118 in order to mitigate a potential hazard or to make the motorcycle easier to handle in an emergency situation.

The control unit 18 also includes an output interface 124 for connecting to one or more output devices 126. The output devices include one or more of haptic devices, for example in the seat, handlebars and/or footpegs; one or more visible indicators, such as LEDs (light emitting diodes); and one or more audible devices. The output devices 126 are activated by the processor 102 when the processor determines that a hazard exists, based on sensed signals from the force-detecting handlebars 12, seat 14 and footpegs 16, the environmental sensors 112 and/or the ECU 118.

The data 108 includes thresholds for determining when a hazard situation exists or is likely to occur based on rider intent, rider experience, the sensed environment and ECU parameters. Rider forces and rider position throughout a journey can be stored in the data 108, as well as a log of detected hazards and responses. Further, transient data may be stored temporarily in the processor 102, for use in calculations to interpret sensor signals.

D. Flowcharts

Figure 8:
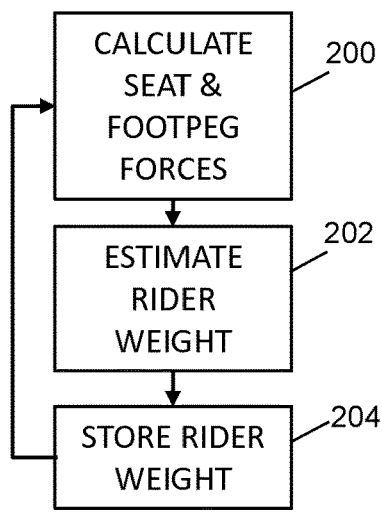
FIG. 8 is a flowchart of an exemplary process that the control unit performs to determine a rider's weight, according to an embodiment of the present invention.

Referring to FIG. 8, in step 200 the processor 102 calculates the individual forces detected by the seat sensors 50, 52, 54, 56, 58, 60, 62, 64, 66 and the sensors 74 in the footpegs 16. In step 202, the processor 102 then sums the detected forces in the footpegs and the seat to determine an estimation of the weight of the rider. In step 204, the weight of the rider is saved in the data 108 portion of the memory 104. The process is performed once when the rider first starts a journey on the motorcycle, and may be repeated from time to time throughout the journey in order to improve the estimation of the rider's weight.

Figure 9:
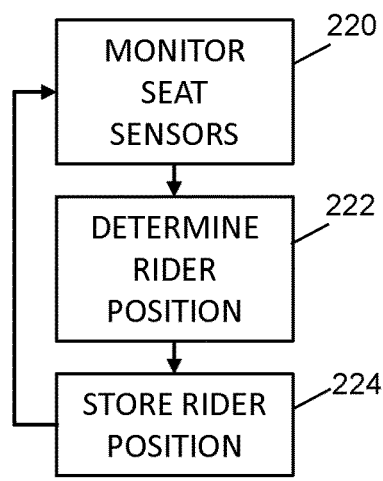
FIG. 9 is a flowchart of an exemplary process that the control unit performs to determine a rider's position, according to an embodiment of the present invention.

Referring to FIG. 9, in step 220 the processor 102 continually or repetitively monitors the signals from the sensors 50, 52, 54, 56, 58, 60, 62, 64, 66 in the force-detecting seat 14. In step 222 the processor 102 determines the rider position on the seat 14 in response to the signals from the seat sensors. In step 224, the processor 102 stores the rider position in the data 108 portion of the memory 104. The position determined is whether the rider is sitting in a neutral position, to the left, to the right, forwards, rearwards, forward to the left, forward to the right, rearward to the left, and rearward to the right. In some embodiments, the position is represented by the distance, in a normally horizontal plane of the seat, of the centre of gravity of the rider from the centre of the seat 14, and also by the direction, in the same plane, of the rider's centre of gravity in relation to the forward direction of the motorcycle. The process then reverts back to step 220. In other embodiments, the forces from the handlebars 12 and/or footpegs 14 are incorporated into the calculation to determine the rider's position.

Figure 10:
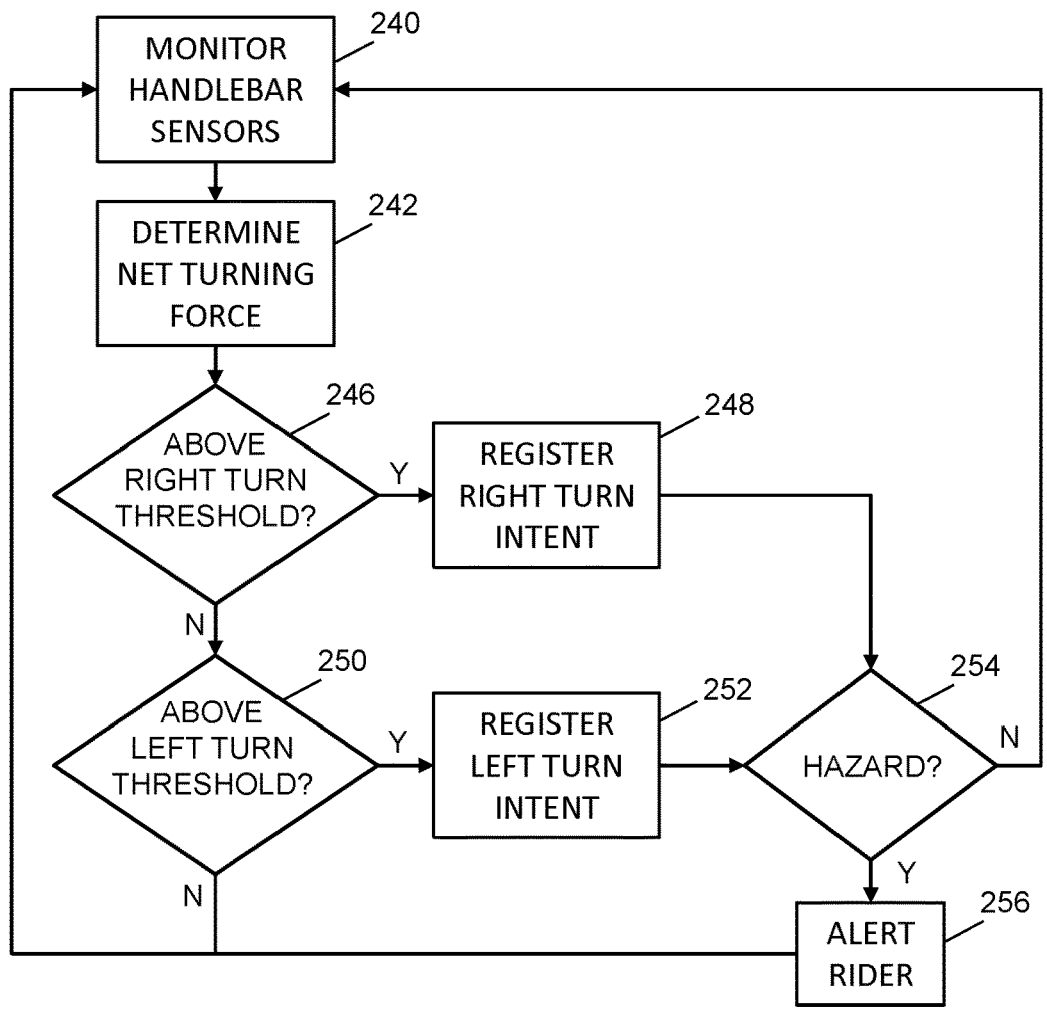
FIG. 10 is a flowchart of an exemplary process that the control unit performs to determine a rider's intent and alert the rider, according to an embodiment of the present invention.

Referring to FIG. 10, in step 240 the processor 102 continually or repetitively monitors signals from the handlebar sensors 82, 84 in both of the handlebars 12. In step 242, the processor determines the net turning force on the handlebars 12. If the motorcycle is balanced and running in a straight line on flat ground, with no side winds, the net turning force on the handlebars should be zero, irrespectively of how tightly the rider is gripping the handlebars 12. The net turning force in a clockwise direction is the sum of the forces on the forward facing sensor on the right handlebar and the rearward facing sensor on the left handlebar, minus the sum of the forces on the forward facing sensor on the left right handlebar and the rearward facing sensor on the right handlebar.

If there is a net turning force (or, in practice, a net turning force above a minimal threshold), the handlebars will turn to the left or the right depending on the direction of the force. Before the handlebars actually turn, there is a change in the net turning force. The processor next determines whether the net turning force is above a threshold. The threshold may be either a fixed magnitude, or a combination of a fixed magnitude and a duration of time for which the magnitude is surpassed. In some embodiments, the magnitude and/or duration are dependent on the experience level of the rider. If, in step 246, the processor determines that the net turning force is above the threshold for turning right, then, in step 248 it registers the rider's intent to turn right or to move over to the right, for example to change to the lane on the rider's right. The intent is registered in the memory 104 of the control unit 18, or in a memory of the processor 102. If, in step 250, the processor determines that the net turning force is above the threshold for turning left, then, in step 252 it registers the rider's intent to turn left or to move over to the left, for example to change to the lane on the rider's left. In step 254, the result of the rider's intent to turn left or right is combined with the data garnered from the environmental sensors 112 and/or the ECU 118 to determine whether there is a potential hazard for the rider. If there is a hazard that would endanger the rider, the rider is alerted in step 256. The benefit afforded to the rider is that the control unit can determine in advance that the rider has decided to make a turn before the rider actually makes the turn. While the advance determination of the turn is only a moment, it can provide an advance warning of a hazard, giving the rider more reaction time to avert the manoeuvre. The process then returns to step 240, to continue monitoring the rider's turning intents.

Figure 11:
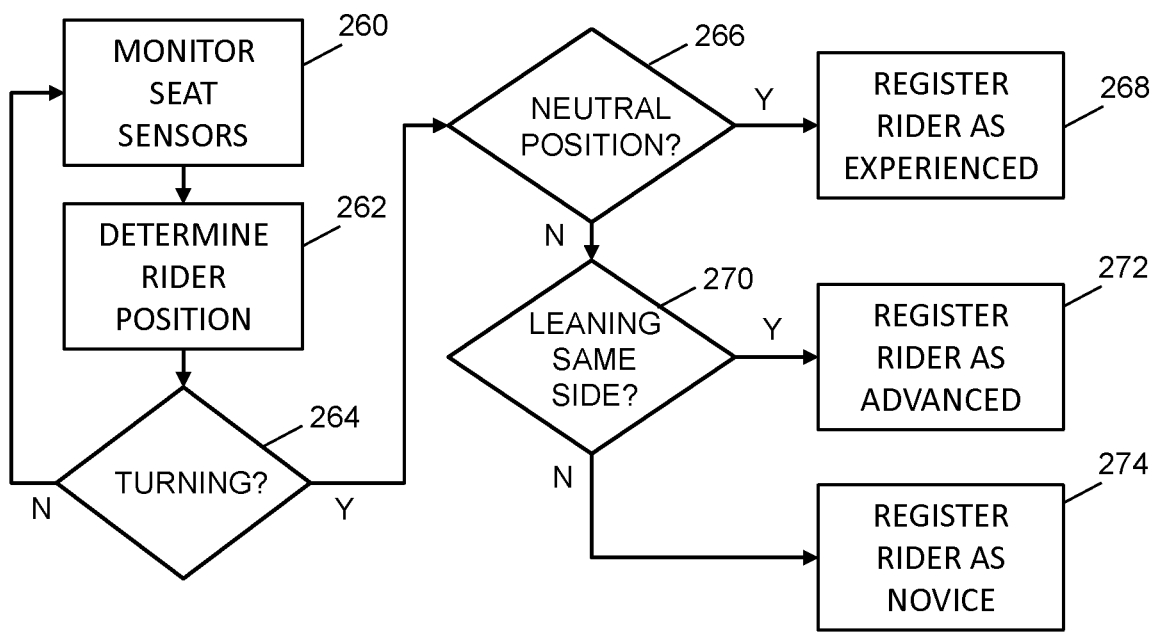
FIG. 11 is a flowchart of an exemplary process that the control unit performs to determine a rider's experience level, according to an embodiment of the present invention.

Referring to FIG. 11, the control unit 18 performs a process that determines the experience level of the rider. In step 260, the processor 102 continually or repetitively monitors the sensors 50, 52, 54, 56, 58, 60, 62, 64, 66 in the force-detecting seat 14. In step 262, the processor determines the riders position on the seat. The position is whether the rider is sitting in a neutral position, to the left, to the right, forwards, rearwards, forward to the left, forward to the right, rearward to the left, and rearward to the right. In some embodiments, the position is represented by the distance, in a normally horizontal plane of the seat, of the centre of gravity of the rider from the centre of the seat 14, and the direction, in the same plane, of the rider's centre of gravity in relation to the forward direction of the motorcycle.

In step 264, the processor 102 determines whether the motorcycle is making a turn. This is achieved by monitoring the forces on the handlebars 12, by detecting a signal from a handlebar rotation sensor, or by detecting signals from an accelerometer. If the rider is making a turn, then, in step 266, the processor determines whether the rider is sitting in a neutral position. If the rider is in a neutral position during the turn, then the processor registers the rider as experienced, in step 268. If the rider is not in a neutral position during the turn, then, in step 270, the processor determines whether the rider is leaning on the same side of the seat as the direction of the turn (i.e. leaning into the turn). If so, the processor 102 registers the rider's experience level as advanced, in step 272. If the rider is not leaning on the same side of the seat as the turn, then, in step 274, the processor 102 registers the riders experience level as novice, because the rider must be leaning in an opposite direction to that of the turn. The rider's experience level is registered in the memory 104 of the control unit 18. In other embodiments, the forces from the handlebars 12 and/or footpegs 14 are incorporated into the calculation to determine the rider's position.

Figure 12:
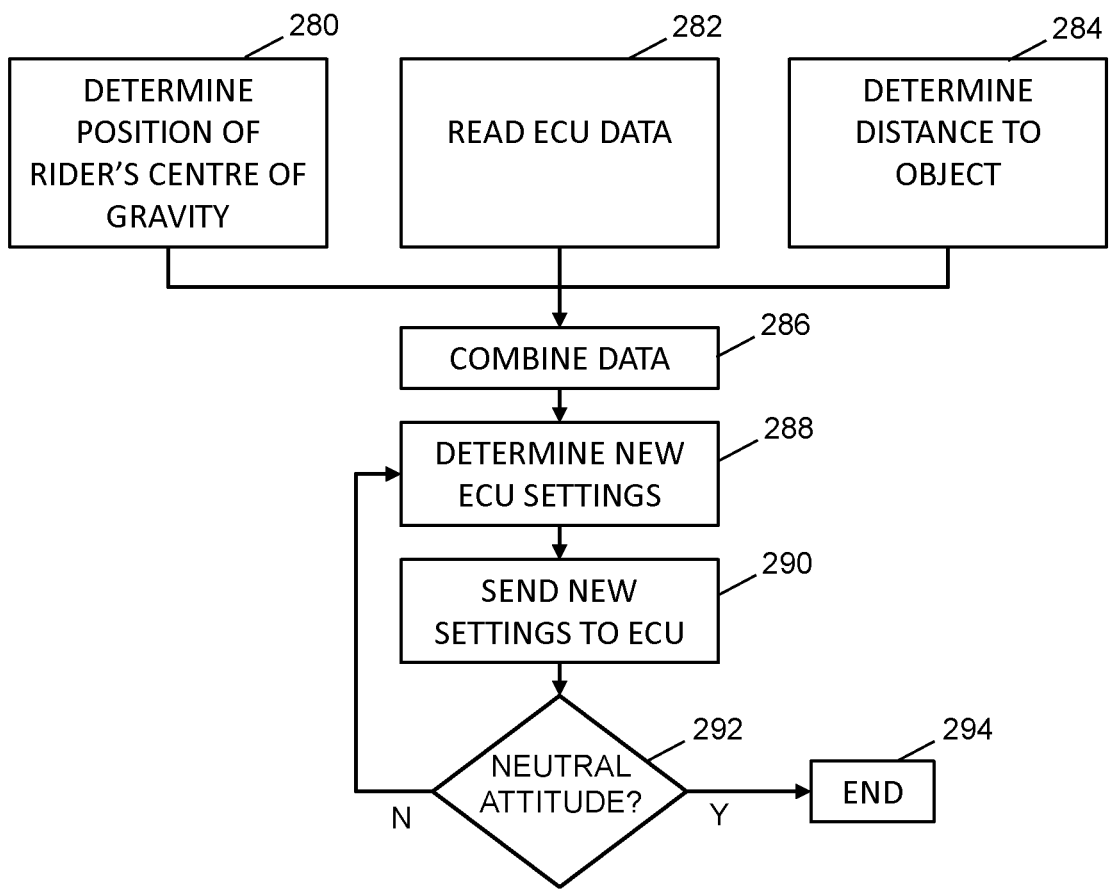
FIG. 12 is a flowchart of an exemplary process that the control unit performs to control settings of the motorcycle, according to an embodiment of the present invention.

Referring to FIG. 12, an example process based on the position of the rider's centre of gravity is shown. Basically, when braking hard (which can be considered to be a hazardous state of the motorcycle), there is considerable force on the arms of the rider due to the deceleration of the motorcycle, and riders mass is biased towards the front of the bike. Adjusting the suspension of the motorcycle affects the extent of its dive, so, by firming up the front suspension, the rider can better maintain control of the motorcycle until the desired speed is achieved. The control unit 18 dynamically adjusts the suspension during the braking until the motorcycle has regained a neutral attitude and/or the forces exerted by the rider on the motorcycle have returned to normal.

In step 280, the processor determines the position of the rider's centre of gravity. In step 282, the processor 102 reads the ECU 118 for data such as current speed, throttle opening, braking pressure, suspension setting and attitude. In step 284, the processor 102 determines the distance to an object in front of the motorcycle, if any. In step 286, the processor 102 combines the information output from steps 280, 282, 284, and in step 288 determines adjusted settings for the ECU 118. The adjusted settings are sent to the ECU 118 by the processor 102 in step 290. The processor 102 then determines, in step 292, whether the attitude of the motorcycle is neutral. If the motorcycle attitude is neutral in step 292, then the process ends in step 294. If, however, the motorcycle attitude is not neutral, the settings sent to the ECU 118 are repeated, or newly adjusted settings are calculated and sent to the ECU, as the process reverts to step 288. Steps 280, 282, 284 and 286 are occurring throughout the process so that whenever step 288 is repeated, the determination of the new ECU settings is based on the most current information available to the control unit 18.

A similar process is performed to dynamically adjust the ECU settings in other hazardous states of the motorcycle, such as changing road conditions and emergency situations.

E. Variations

While the best presently contemplated mode of carrying out the subject matter disclosed and claimed herein has been described, variations are possible.

For example, the force-detecting sensors may be used to determine the type of motorcycle in which they are installed. For example, TABLE 1 shows the expected rider weight distribution on handlebars, seat, and footpegs for different types of motorcycle.

TABLE 1

| Type of motorcycle | Handlebar force | Seat force | Footpeg force |
|---|---|---|---|
| Scooter | light | neutral | light |
| Cruiser | light | rear bias or neutral | heavy |
| Motocross | light | neutral | heavy |
| Super Sport | heavy | forward bias or neutral | light |

While examples of warning devices have been given that are mounted on the motorcycle, other warning devices may be used, such as helmet-mounted devices that are activated by short-range radio communications from the control unit.

Although the present invention has been illustrated principally in relation to two-wheeled motorcycles, it also has application in respect of three-wheeled motorcycles.

Sending a signal can be interpreted to be either the actual creation of a signal that is transmitted from a sensor or the ceasing of a signal that is being created by and transmitted from the sensor. Either way, the change in output of the sensor can be interpreted as a signal. A null signal may also be considered to be a signal. The signal may, for example, be a change in voltage, resistance, capacitance or current. In other cases the signal may be an image or a change in an image.

In general, unless otherwise indicated, singular elements may be in the plural and vice versa with no loss of generality.

Throughout the description, specific details have been set forth in order to provide a more thorough understanding of the invention. However, the invention may be practiced without these particulars. In other instances, well known elements have not been shown or described in detail and repetitions of steps and features have been omitted to avoid unnecessarily obscuring the invention. Accordingly, the specification and drawings are to be regarded in an illustrative, rather than a restrictive, sense.

It will be clear to one having skill in the art that further variations to the specific details disclosed herein can be made, resulting in other embodiments that are within the scope of the invention disclosed. Other steps may be added to the flowcharts, or one or more may be removed without altering the main function of the rider state determination system described herein. Modules may be divided into constituent modules or combined into larger modules. All configurations described herein are examples only and actual ones depend on the specific embodiment. Accordingly, the scope of the invention is to be construed in accordance with the substance defined by the following claims.

The invention claimed is:

1. A system for determining a motorcycle rider's intention to turn comprising:
   a plurality of force sensors, of which:
      one or more are mounted in a left handlebar of the motorcycle, and
      one or more are mounted in a right handlebar of the motorcycle;
   wherein the plurality of force sensors detect forces exerted on the left and right handlebars of the motorcycle by the rider of the motorcycle; and
   a control unit communicatively connected to the plurality of force sensors and configured to:
      receive signals from the plurality of force sensors;
      make a comparison of the signals with one or more thresholds; and
      determine the intention of the rider to turn, using the comparison and before the handlebars on the motorcycle are turned to make the intended turn.

2. The system of claim 1, wherein further force sensors are mounted in:
   a seat of the motorcycle;
   a left footpeg of the motorcycle; and
   a right footpeg of the motorcycle; and
   the control unit is configured to:
      receive signals from the further force sensors;
      make a comparison of the signals from the further force sensors with one or more further thresholds; and
      determine a state of the rider using said comparisons.

3. The system of claim 2, wherein the state is an experience level of the rider.

4. The system of claim 2, wherein:
   the control unit is communicatively connected to an engine control unit (ECU) of the motorcycle; and
   the control unit is configured to:
      read parameters of the motorcycle from the ECU;
      determine a hazardous state of the motorcycle from values of the parameters and from the state of the rider; and
      send an alternate value of at least one of the parameters to the ECU to control at least one setting of the motorcycle during the hazardous state.

5. The system of claim 4, wherein the hazardous state is harsh braking, the alternate value is a suspension setting, and the control unit dynamically controls the suspension during the harsh braking.

6. The system of claim 2, wherein the control unit is further configured to determine a type of motorcycle based on the signals from the plurality of force sensors and the signals from the further force sensors.

7. The system of claim 1, further comprising:
   an environmental sensor mounted on the motorcycle and connected to the control unit; and
   an output device communicatively connected to the control unit;
   wherein the control unit is configured to:
      receive signals from the environmental sensor;
      determine, based on the signals from the environmental sensor, whether the intended turn would endanger the rider; and
      activate the output device when the control unit determines that the intended turn would endanger the rider.

8. The system of claim 7, wherein the output device is one or more of:
   a haptic device embedded in a seat or footpeg of the motorcycle;
   a light-emitting diode; and
   an audible device.

9. The system of claim 7, comprising another output device, wherein the output device and the other output device are haptic devices embedded in said handlebars.

10. A method for determining a motorcycle rider's intention to turn comprising:
    locating, on the motorcycle, a plurality of force sensors of which one or more are located in a left handlebar and one or more are located in a right handlebar of the motorcycle, so as to detect forces exerted on left and right handlebars by the rider of the motorcycle;
    receiving, by a control unit, signals from the plurality of force sensors;
    making, by the control unit, a comparison of the signals to one or more thresholds; and
    determining, by the control unit, the intention of the rider to turn, using the comparison and before the handlebars on the motorcycle are turned to make the intended turn.

11. The method of claim 10, wherein further force sensors are mounted in:
    a seat of the motorcycle;
    a left footpeg of the motorcycle; and
    a right footpeg of the motorcycle; and
    the method comprises:
       receiving, by the control unit, signals from the further force sensors;
       making a comparison of the signals from the further force sensors with one or more further thresholds; and
       determining a state of the rider using said comparisons.

12. The method of claim 11, wherein the state is an experience level of the rider.

13. The method of claim 12, comprising:
    determining that the motorcycle is making a turn; and
    determining that the rider is:
       leaning in an opposite direction to a direction of the turn and therefore that the experience level is novice; or
       sitting in a neutral position and therefore that the experience level is experienced; or
       leaning on the seat in the direction of the turn and therefore that the experience level is advanced.

14. The method of claim 10, the method further comprising:
    connecting an environmental sensor mounted on the motorcycle to the control unit;
    receiving, in the control unit, signals from the environmental sensor;
    determining, by the control unit, based on the signals from the environmental sensor, whether the intended turn would endanger the rider; and
    activating, by the control unit, a haptic output device in the handlebars when the control unit determines that the intended turn would endanger the rider.

15. The method of claim 10, further comprising:
    reading, by the control unit, parameters of the motorcycle from an engine control unit (ECU) of the motorcycle;
    determining, by the control unit, a hazardous state of the motorcycle from values of the parameters and from the state of the rider; and
    sending, by the control unit, an alternate value of at least one of the parameters to the ECU to control at least one setting of the motorcycle during the hazardous state.

16. The method of claim 15, wherein the hazardous state is harsh braking and the alternate value is a suspension setting, the method comprising the control unit dynamically controlling the suspension during the harsh braking.

17. The method of claim 16, comprising determining an attitude of the motorcycle; and repeating the sending step while the attitude is not neutral.

* * * * *